United States Patent [19]

Didier

[11] Patent Number: 4,628,392

[45] Date of Patent: Dec. 9, 1986

[54] EXPLOSION PROOF ELECTRICAL CONNECTOR SYSTEM WITH QUICK POWER DISCONNECT

[75] Inventor: Robert G. Didier, Santa Rosa, Calif.

[73] Assignee: BIW Cable Systems, Inc., Boston, Mass.

[21] Appl. No.: 610,595

[22] Filed: May 15, 1984

Related U.S. Application Data

[63] Continuation-in-part of Ser. No. 563,503, Dec. 20, 1983.

[51] Int. Cl.[4] .......... H02H 7/00

[52] U.S. Cl. .......... 361/2; 200/51.04; 200/144 R; 339/111

[58] Field of Search .......... 361/2, 3, 6; 200/144 R, 200/145, 302.1, 51.04, 51.1; 307/140; 339/94 R, 94 M, 111

[56] References Cited

U.S. PATENT DOCUMENTS

| | | | |
|---|---|---|---|
| 2,605,315 | 7/1952 | Hargett | 339/94 M |
| 2,655,638 | 10/1953 | Allen | 339/94 M |
| 3,197,730 | 7/1965 | Hargett | 339/94 M |
| 3,235,682 | 2/1966 | Papworth | 200/51.07 |
| 3,283,214 | 11/1966 | Ortwig et al. | 361/3 |
| 3,665,509 | 5/1972 | Elkins | 339/94 M |
| 3,871,734 | 3/1975 | Murtland | 339/94 M |
| 3,879,659 | 4/1975 | Lawson, Jr. et al. . | |
| 3,945,700 | 3/1976 | Didier . | |
| 4,073,559 | 2/1978 | Lawson, Jr. et al. . | |
| 4,166,664 | 9/1979 | Herrmann, Jr. | 339/111 X |
| 4,346,419 | 8/1982 | Janniello | 361/2 |

OTHER PUBLICATIONS

BIW Cable Systems, Inc., Assembly Instruction Manual Nos. A400-0007 and A400-0014.

*Primary Examiner*—A. D. Pellinen
*Assistant Examiner*—A. Jonathan Wysocki
*Attorney, Agent, or Firm*—Kenway & Jenney

[57] ABSTRACT

An electrical connector system, particularly one that connects armored electrical cables for oil wells through an upper surface connector that is mated to a feed-through mandrel, automatically operates a circuit breaker in the main power circuit as the upper connector is unmated from the mandrel. A pair of relay (R) wires are carried with the main power conductors through the upper connector. A set of relay (R) contacts, preferably pins and sockets, electrically connect the R wires between the connector and the mandrel. The contacts in the mandrel are wired together. Unmating the connector withdraws the R pins from their sockets which trips a relay or otherwise operates the main circuit breaker. Power (P) contacts, preferably pins and sockets, for the main power conductors are longer than the R pins so that power in the main conductors is shut off before arcing can occur. Preferably this "quick disconnect" relay circuit is used in conjunction with an improved lip seal formed on the mating end of a resilient insulating body filling the connector. The inner diameter of the resilient lip is less than the outer diameter of the mating portion of the mandrel to stretch the lip seal and thereby establish a very tight fit when the connector is attached to the mandrel. The lip seal isolates the interior of the connection site from fluids surrounding the connector and is sufficiently long that it continues to seal even during uncoupling to prevent an explosion due to arcing at the R contacts.

3 Claims, 11 Drawing Figures

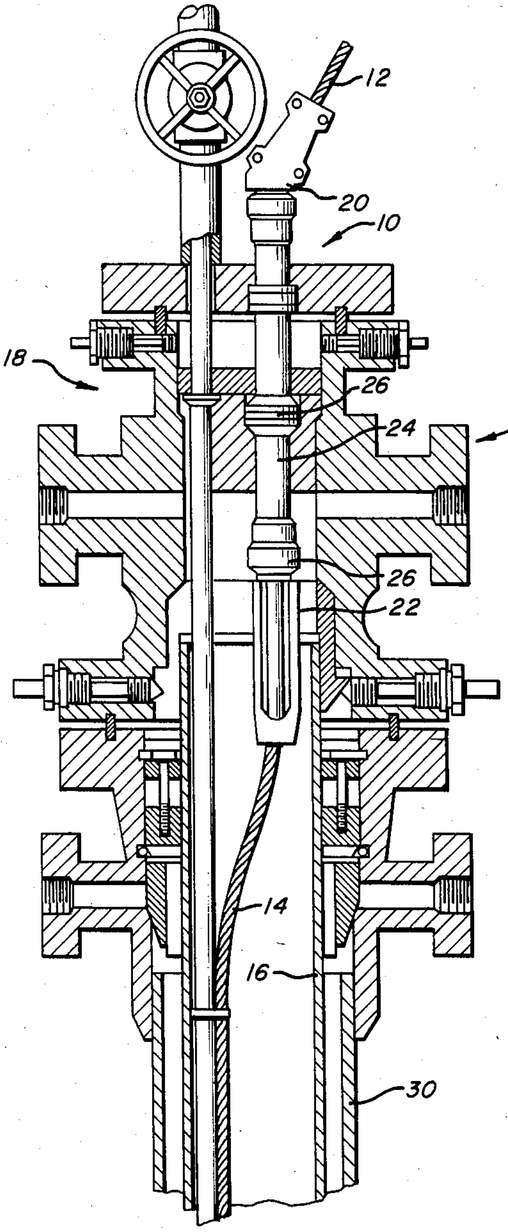
FIG. 1
FIG. 3
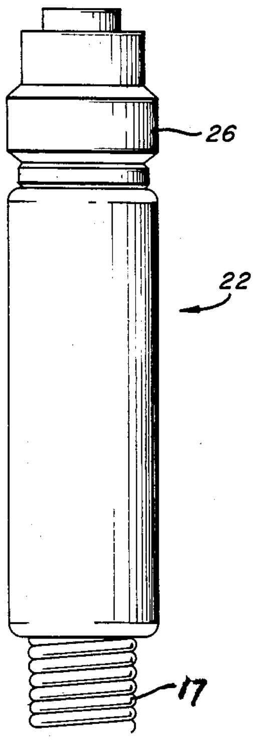
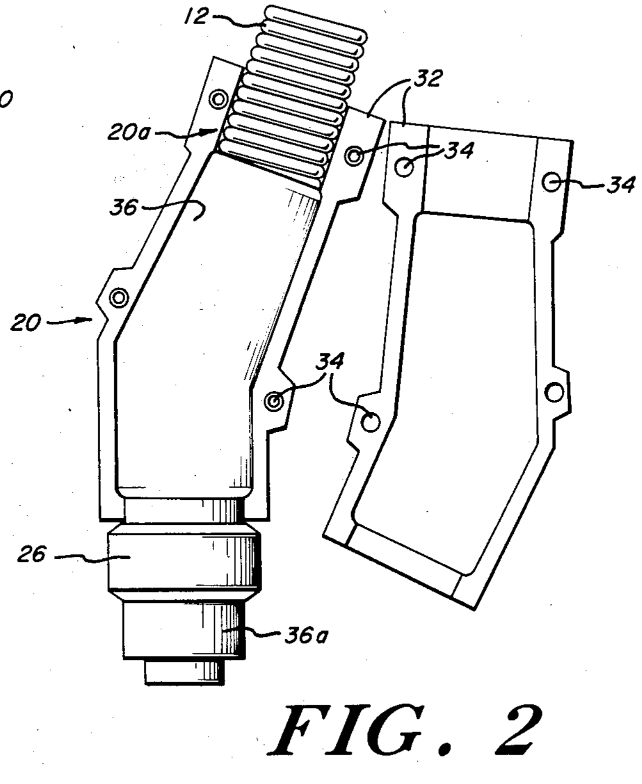
FIG. 2

EXPLOSION PROOF ELECTRICAL CONNECTOR SYSTEM WITH QUICK POWER DISCONNECT

REFERENCE TO RELATED APPLICATION

This application is a continuation-in-part of U.S. Ser. No. 563,503, filed Dec. 20, 1983 entitled "Explosion Proof Electrical Connector System with Improved Seal".

BACKGROUND OF THE INVENTION

This invention relates in general to electrical connectors. More specifically, it relates to an upper surface connector for armored cables used in oil wells where the connector has a quick disconnect electrical relay circuit that shuts off the main power flow through the connector before arcing can occur.

Electrical connectors for armored cables are particularly important in the production of oil. Submersible pumps are often used in an oil well to extract the maximum volume of oil from the well site. Such pumps rest in the oil at the bottom of the well. Armored cables conduct electrical power from ground level to the pump. A typical cable has multiple power conductors, each with their own insulation, surrounded by further insulation and an outer metallic jacket. The conductors are capable of carrying current at high power levels, for example, 100 amperes, at high voltages, for example, 3,000 volts RMS. The armor jacket and heavy insulation are necessary to protect the conductors from both mechanical damage and the corrosive or explosive capabilities of fluids in the well such as liquid oil or water and flammable hydrocarbon gases that are often under very high pressures—several thousand pounds per square inch (psi). At "upper" or surface connectors mounted at the exterior of the wellhead in a normal atmosphere, combustion problems are enhanced by the presence of oxygen gas. Heretofore no "upper" electrical connector has been rated as "explosion proof." A principal problem has been the leakage of gas past couplings between the connector and an adjoining element (e.g. the socket of a feed-through mandrel for a wellhead or packer). This leakage problem has been particularly evident under dynamic conditions, where there are rapid changes in pressure or temperature, and where there is an aging of resilient materials that form a seal against the fluids.

The present invention is an improvement on the connector described in U.S. Pat. No. 3,945,700 which is commonly assigned with the present application. The '700 connector has as its principal components (1) a generally cylindrical housing that receives an armored cable at one end, (2) internal mold rubber bodies that guide and seal the conductors of the cable and their immediately surrounding insulation, (3) "contactor tubes" mounted in one of the rubber bodies which are electrically connected to a conductor and form a socket, and (4) a rotating, threaded coupling system that replaceably secures the connector to a mating cylindrical "socket" with pin contacts that are received in the contactor tubes. The coupling system includes a coupling sleeve and a coupling ring rotatably mounted on the sleeve. One end of the sleeve is seated in an annular groove formed in the main rubber body. The other end, which carries the coupling ring, is external to the rubber body and the housing. The coupling ring is also at the exterior of the connector where it is directly exposed to the fluid environment.

The '700 connector has proven to be reliably explosion resistant when used as a lower connector (at the interior of the wellhead or packer secured to a socket mounted at the bottom of a wellhead or packer feed-through mandrel), however, this connector has not been rated as explosion proof when adapted for use as an upper connector. A principal reason is the fluid leakage problems noted above. Rapid pressure and temperature variations will allow fluids to leak "under" the coupling ring where they can seep further inside the connector. Material fatigue over time, particularly of thin-walled rubber parts, can result in deformation or movement of components that will allow fluid leakage. Leakage is also possible if the coupling ring becomes loose or is purposely loosened for adjustment. If the fluid is a combustible gas, then there is an increased danger of an explosion at the connector. Other fluids can cause corrosion and a deterioration of the performance of the connector over time.

Another problem is that if the power is accidentally left on during the uncoupling of a connector, then there will be arcing between the electrical connectors as they disengage. If combustible fluids are present, as is often the case, this arcing can lead to an explosion. This problem is particularly significant at upper surface connectors where oxygen gas is present.

It is therefore a principal object of this invention to provide an electrical connector system for an upper surface connector with an electrical disconnect system that cuts off power through the main power conductors before they arc as their contacts break electrical connection.

Another object of this invention is to provide a connector system that is extremely explosion proof even at an upper connector of a wellhead located in an atmosphere containing oxygen gas and even if the electrical power is accidentally left on during an uncoupling of the connector.

A further object is to provide a connector system that blocks the flow of fluids, including gases under high pressure, to the interior of the connector even where the connector is subjected to rapid variations in temperature or pressure or where the connector is more prone to leak fluids due to material fatigue and general aging.

Another object is to isolate the interior of the connector system from hostile or combustible fluids until the quick disconnect system shuts off electrical power in the main conductors.

A still further object is to provide an improved connector with the foregoing advantages with only few modifications to known, commercially successful connectors.

SUMMARY OF THE INVENTION

An electrical connector for armored cables, particularly an upper surface connector used at wellheads, has a hollow housing formed of a high strength structural material and one or more resilient insulating bodies that substantially fill the housing and guide the cable and its components. The cable enters the housing at one end of the connector and its conductors, typically three heavy power conductors and two smaller diameter relay ("R") wires, each terminates within the connector in electrical contacts. These contacts, preferably longitudinally oriented sockets, are molded in the insulating body in an array at one end of the housing opposite the cable. They preferably terminate in a common plane. The insulating body mounts a coupling sleeve and a rotatable coupling ring mounted on the coupling sleeve. A generally cylindrical skirt of a feed-through mandrel or an equivalent member fits firmly on an "exterior" end of the insulating body that carries the contacts.

The feed-through mandrel carries a set of conductors corresponding to those of the cable and each terminating in electrical contacts, preferably pins that are received in an associated socket in the connector at least when the coupling sleeve is tightened to secure the connection. The R wires form part of a quick disconnect circuit that also includes a set of R pins and associated R sockets that electrically connect the R wires when the upper connector is mated to the mandrel. The R pins are shorter than the power pins so that the R wire circuit will open before the main power circuit. The R pins are connected to one another within the feed-through mandrel. When the R pins are withdrawn from the R sockets the relay circuit opens to operate a main circuit breaker in the power circuit. Preferably the R wires in the upper connector run to a junction box at the surface that houses the main circuit breaker and are connected to a relay that opens the circuit breaker when the R circuit opens.

A resilient, insulating, lip seal is secured on the outer surface of the insulating body at a point under the coupling ring. The lip seal has a generally cylindrical configuration and extends axially to overlie the outer surface of the mandrel skirt. The inner diameter of the lip seal is smaller than the outer diameter of the mandrel skirt so that the lip seal must stretch radially to fit onto the skirt. This stretch produces an initial, very tight fit between the lip seal and the skirt. Also the free ends of the lip seal and the skirt are preferably chamfered to facilitate the insertion of the lip seal onto the skirt.

The lip seal is preferably formed integrally with the insulating body of molded rubber. The lip seal is located and structured so that any fluid that leaks past the coupling will exert a fluid pressure on the outer surface of the lip seal forcing it into an enhanced sealing engagement with the mandrel skirt. This seal blocks any further leakage to the interior of the connector. Moreover, the sealing force increases as the fluid pressure increases. In addition, the lip seal is prefereably longer axially than the R pins. As a result, the lip seal continues to isolate the interior of the connector from combustible fluids as the R pins withdraw from the R sockets. This prevents arcing at the R wire contacts during the "quick" disconnect from exploding combustible gases that may surround the connector.

These and other features and objects of the present invention will be more readily understood from the following detailed description which should be read in light of the accompanying drawings.

BRIEF DESCRIPTION OF THE DRAWINGS

FIG. 1 is a simplified view in vertical section and partly in elevation of an oil wellhead that uses upper and lower connectors constructed according to the present invention with improved seals that connect to the upper and lower ends, respectively, of a wellhead feed-through mandrel;

FIG. 2 is a detailed view in side elevation of the upper connector shown in FIG. 1 with the housing screws removed and one housing half opened and an armored cable entering one end of the connector;

FIG. 3 is a detailed view in side elevation of the lower connector shown in FIG. 1 with an armored cable entering one end of the connector;

DETAILED DESCRIPTION OF THE PREFERRED EMBODIMENTS

Figure 4:
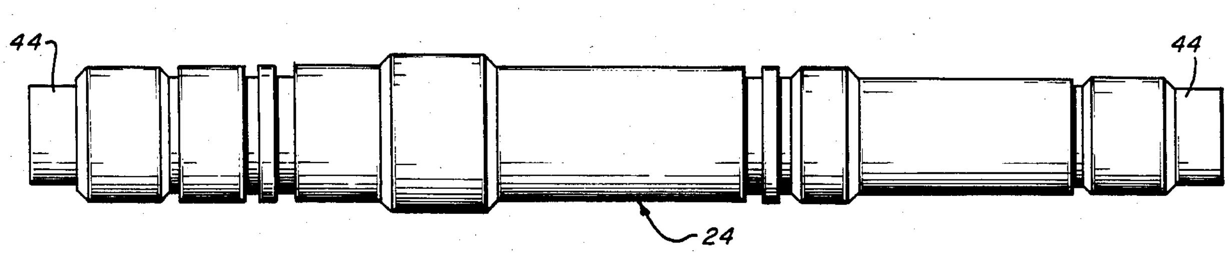
FIG. 4 is a view in side elevation of the electrical feed-through mandrel shown in FIG. 1.

FIG. 1 shows an electrical connector system 10 according to the present invention used to supply electrical power from an upper armored cable 12 above ground to a lower armored cable 14 located within a production casing 16 of an oil wellhead 18. The armored cable 17 typically continues down the well to a submersible pump (not shown) located in oil at the bottom of the well. The cables typically have multiple main electrical power conductors 50,50,50 (FIGS. 8-11) that carry heavy industrial power loads at high voltage levels, e.g. 3,000 volts AC, RMS. Within the wellhead, it is typical to encounter fluids such as water vapor, water, oil and combustible hydrocarbon gases that may be at high pressure levels, e.g. several thousand pounds per square inch (psi). The pressure and temperature acting on the connector system 10 can vary rapidly and the variation can be of large magnitude. The connector system as shown includes an upper connector 20, a lower connector 22, and a feed-through mandrel 24 of well-known, conventional construction. The upper and lower connectors are replaceably secured to opposite ends of the mandrel by coupling rings 26.

The wellhead includes a "Christmas tree" 28 that tops an oil well casing 30 at ground level. The casing 30 surrounds the production casing 16. The other support, seal and valve structures of the wellhead are standard. A more detailed description of such a wellhead appears in the aforementioned U.S. Pat. No. 3,945,700.

The lower connector 22 is substantially the same as the connector described in U.S. Pat. No. 3,945,700 except as will be discussed below. The upper connector 20, as can be best seen in FIGS. 2 and 5, has a two-part exterior housing 32 that is clamped together by screws (not shown) at the threaded holes 34 to provide a rigid, hollow structure with high strength. The housing is preferably formed of heavy steel. An end 20*a* of the connector receives and guides the upper armored cable 12 which terminates in the upper connector in the same general manner as the lower cable 16 terminates in the lower connector 22 (which is described in detail in the '700 patent). A main resilient insulating body 36, alone or in combination with additional resilient insulating bodies, substantially fills the interior space of the housing 32 except for the cable 12 and electrical conduction members mounted in the body 36. The conduction members transmit electrical power from each conductor to a portion of the conduction member that can plug into a mating conduction member secured at the adjacent end of the mandrel. The body 36 is preferably formed of molded rubber.

Figure 5:
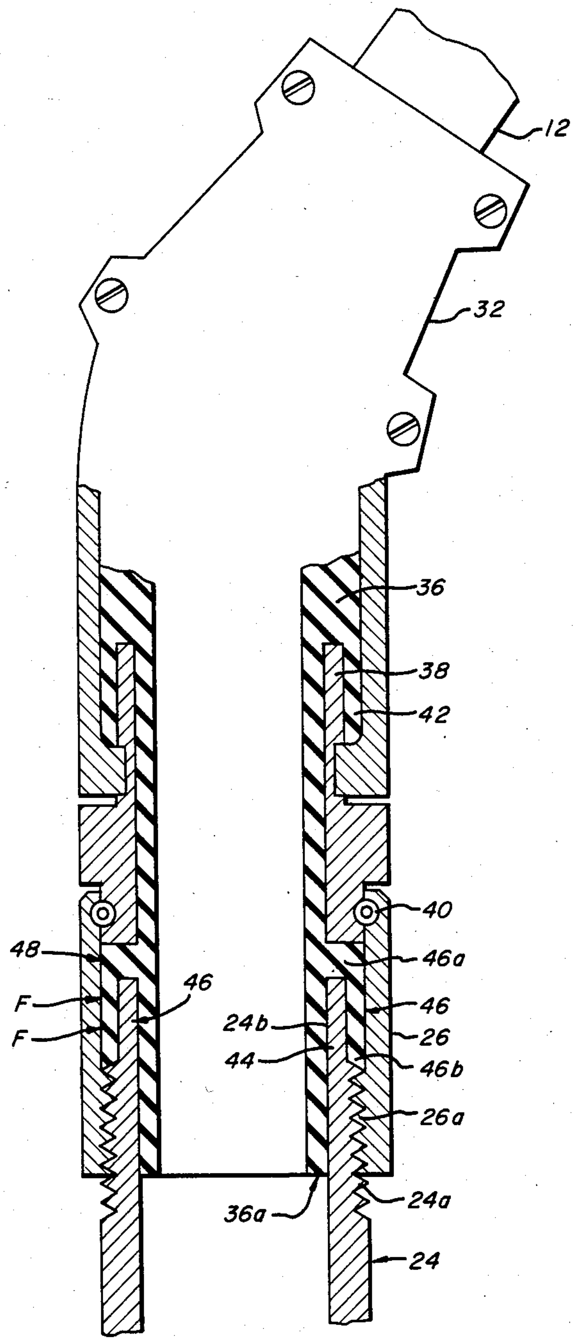
FIG. 5 is a detailed view in vertical section of the improved lip seal according to the present invention used to seal the coupling between the upper connector shown in FIGS. 1 and 2 and the mandrel shown in FIGS. 1 and 4.
Figure 6:
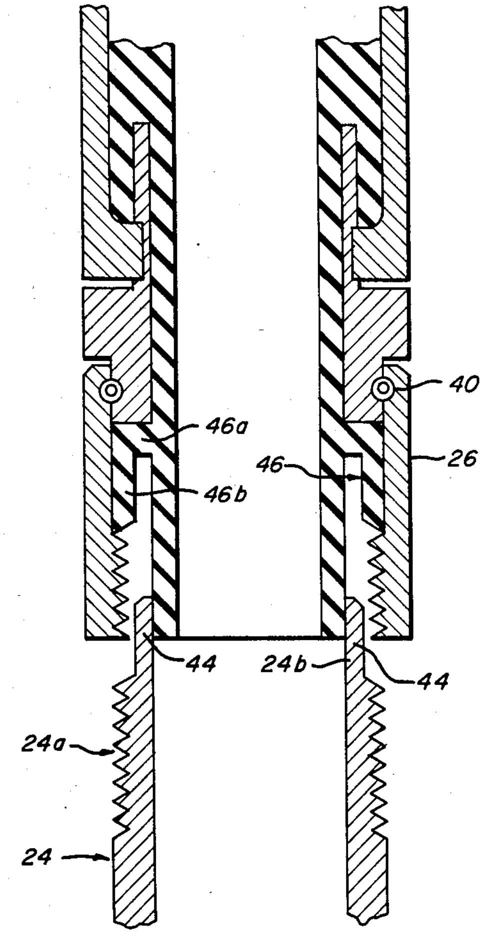
FIG. 6 is a view corresponding to FIG. 5 but with the upper connector and the mandrel substantially uncoupled.
Figure 7:
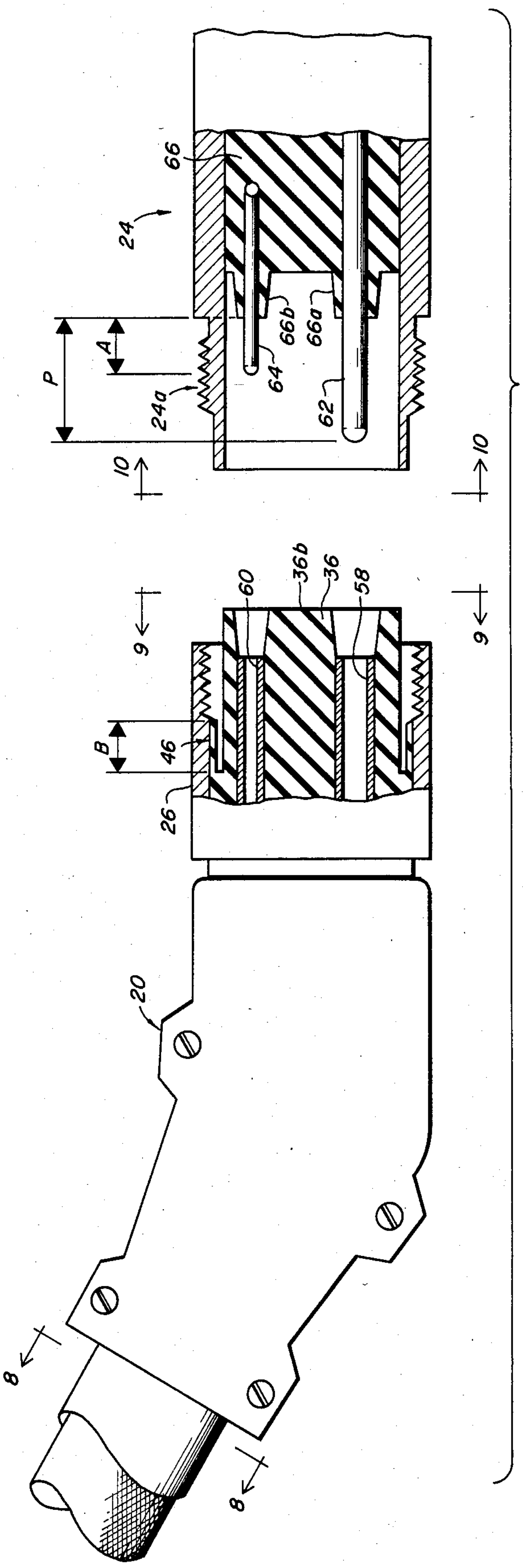
FIG. 7 is a view in side elevation of an upper surface connector corresponding generally to FIGS. 2 and 5 and a feed-through mandrel of the type shown in FIG. 4 with the mating end portions of the connector and the mandrel shown separated and in vertical section through one power conductor and one R wire.

As is best seen in FIGS. 5 and 6, the connector 20 (and similarly the lower connector 22) are coupled mechanically to an adjoining end of the feed-through mandrel 24 by the coupling ring 26. One inwardly facing end **26*a* of the ring threads onto the outer surface of the mandrel at 24*a*. The opposite end of the coupling ring is rotatably mounted on a coupling sleeve 38 through a retaining ring 40. Most of the coupling sleeve is firmly lodged in an open annular recess 42 formed in the body 36**. The coupling sleeve and ring are preferably formed of a rigid structural material such as steel.

The mandrel 24 has a skirt 44 of reduced outside diameter formed at both ends. The skirt projects beyond the threaded coupling connection at **24*a*. The interior surface 24*b* of the mandrel at the skirt 44 and at the threads 24*a* is smooth and has a constant diameter. An end portion 36*a* of the body 36 with a reduced outside diameter projects from the connector into a close-fitting relationship with this interior mandrel surface. This relationship aligns the mandrel with respect to the connector and the quality of this seal depends, of course, on the nature of the fit between the portion 36*a* and the interior surface 24*b*** with a continuous tight fit producing a better quality seal.

A lip seal 46 is secured at a base portion **46*a* to the outer surface of the body portion 36*a* and has an annular wall or "lip" portion 46*b*. The inside diameter of the lip portion 46*b* is slightly smaller than the outside diameter of the skirt 44. Therefore, when the skirt is fully seated in the annular opening between the lip seal 46 and the body portion 36*a* (FIG. 5), the inner surface of the lip seal is in a very tight, continuous, sealing relationship with the adjacent outer surface of the skirt. This sealing relationship is very effective in blocking any fluid flow to the interior of the mandrel or the connector should fluid leak through the coupling system, as for example, when the coupling is loosened, it goes through rapid temperature or pressure cycling (hydraulic schock), or it suffers from material fatigue or other aging. The inner edge 46*c* of the tip portion 46*b* and the outer edge 44*a*** of the skirt are chamfered to facilitate sliding the lip seal onto the skirt despite the differences in their diameters which force the lip seal to stretch radially.

An advantage of the lip seal 46 is that the larger the fluid pressure present in the region 48 "under" the coupling ring 26, the larger will be the fluid pressure acting on the outer surface **46*a* of the lip seal 46 and urging it even more strongly into the sealing relationship with the skirt 44. Arrows F in FIG. 5** illustrate this enhanced sealing force generated by a fluid that leaks to the region under the sealing ring.

The lip seal is preferably formed integrally with the body 36 of molded rubber, as shown. This construction has manufacturing economies and avoids the problem of reliably securing the lip seal to the body. Also, the lip seal is located and sized to fill most of the annular region 48 (defined by the ring 26, the sleeve 38, the body portion **36*a* and the end of the mandrel 24 including the skirt 44). As shown, the "upper" edge of the base portion 46*a* preferably abuts the lower edge of the sleeve 38 and the "lower" edge of the portion 46*a* abuts the edge of the skirt 44**.

FIGS. 7–11 show a principal feature of the present invention, a quick disconnect system that shuts off power in the three main power conductors 50,50,50 of the cable 12 using the two relay or "R" wires 52,52 also carried in the cable 12. The R wires in the upper connector 20 and the cable 12 leading into the upper connector are connected at one end across a relay 54 which is typically located in an above-ground junction box together with a main circuit breaker 56 for the power conductors 50. When the relay circuit is opened, the relay 54 activates or deactivates which in turn operates the circuit breaker 56 to shut off power in the conductors 50. For additional safety, the R wires are preferably rated to carry a full power voltage of 3,000 volts AC, RMS even though they are of a smaller diameter than the conductors 50. At the mating ends of the upper connector 20 and the mandrel 24, the conductors all terminate in contacts that make electrical connection with an axial inserting movement and break electrical connection with an axial withdrawing movement.

Figure 10:
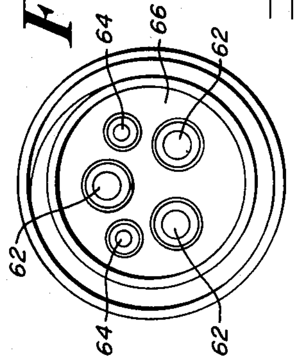
FIG. 10 is a view taken along the line 10—10 in FIG. 7.
Figure 9:
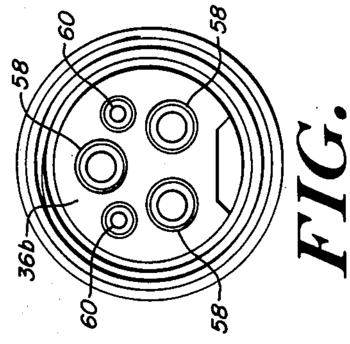
FIG. 9 is a view taken along the line 9—9 of FIG. 7.
Figure 8:
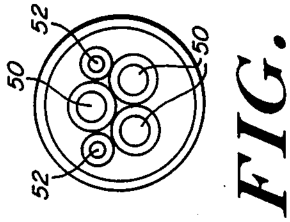
FIG. 8 is a view taken along the line 8—8 in FIG. 7.
Figure 11:
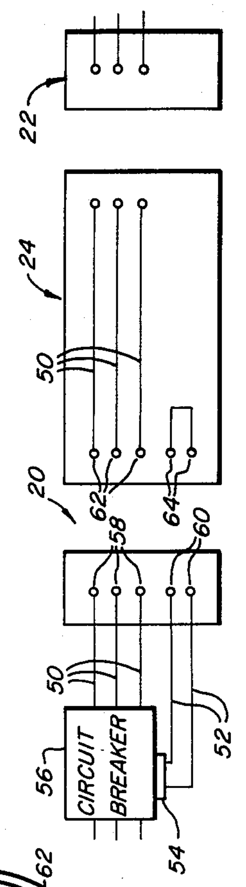
FIG. 11 is a schematic diagram of the electrical circuits of the elements shown in FIGS. 7-10.

The contacts for the power conductors 50 in the upper connector (shown in FIG. 7 without its outer housing) are preferably sockets 58 each secured on the end of a conductor and sealed in the molded rubber body 36 axially, that is, generally parallel to the longitudinal axis of the cable 12 and its connectors. The contacts for the R wires in the upper connector similarly are sockets 60 each connected to one of the R wires and also sealed in the molded rubber body 36 as is best seen in FIG. 9. The open ends of these sockets lie in a common transverse plane that is recessed from the end plane **36*b* of the body 36. Corresponding main power conductors 50,50,50 in the mandrel 24 terminate in power ("P") pins 62 that are sealed in and project from a rubber body 66 that fills the mandrel. The rubber body 66 also secures a pair of relay (R) pins 64,64 that project axially from the body 66 and are positioned, as shown in FIG. 10, for insertion into associated ones of the sockets 60,60 with an axial sliding movement. The pins 62 are also arrayed and oriented so that they each are received in an associated socket 58 with an axial sliding movement to establish an electrical connection when the mandrel 24 is mated with the upper connector 20, and particularly when the coupling ring 26 is tightened onto the threads 24*a*. To produce an enhanced fluid seal around the pins, each pin is surrounded by a rubber boss 66*a* or 66*b* that fits snugly into a corresponding recess in the rubber body 36 leading to the sockets 58,60**.

A significant feature of the present invention is that the R pins 64 extend axially from the bosses **66*b* a distance A that is less than the axial distance P that the R pins extend from the bosses 66*b*. Because the bosses terminate in the same transverse plane and the sockets 58,60 also terminate in a common transverse plane, this difference in pin length means that the R pins 64,64 will disconnect from their associated R sockets 60,60 to open the relay circuit while each P pin 62 is still inserted, although not fully inserted, in its socket 58. As a result, the relay 54 activates or deactivates the main circuit breaker 56 to shut off electrical power in the conductors 50,50,50 before the contacts 58,62** disconnect. This avoids any possibility of an arcing at these contacts if the power is accidentially left on while the upper connector is unmated from the mandrel.

It is also significant that the lip seal 46 extends axially a distance B that is larger than the distance A. Because of this difference, the lip seal will remain engaged to the mandrel skirt 44 in a sealing relationship when the R pins 64 disconnect from their sockets 60. This means that even if there is arcing at the R contacts on breaking, the lip seal isolates the site of the arcing at the interior of the connector from any combustible gases that may be present at the exterior of the connector.

While the invention has been described with respect to its preferred embodiments, other alternative constructions can be used. For example, while the power and relay contacts have been described as pins and sockets, other types of known contacts that make and break electrical connection with an axial motion can be used. Also, using pins and sockets, the sockets can be mounted in the mandrel and the pins mounted in the upper connector and the pins can be of equal length while the length of the sockets are varied to provide the quick disconnect described above. Of course, it is also possible to use pins and sockets that both vary in length provided that the R contacts disconnect prior to the P contacts. Further, while the invention has been described with reference to a relay in the relay circuit, it is possible to have other circuit configurations that interrupt power transmission on the main power conductors when the R contacts open. One such arrangement is to wire the "relay" circuit in series with the coil of the main circuit breaker so that opening the relay circuit automatically activates the circuit breaker.

These and various other modifications and alteration will occur to those skilled in the art. Such modifications and variations are intended to fall within the scope of the appended claims.

What is claimed is:

1. An explosion-proof electrical connector system that couples first and second connector members carrying main electrical power conductors in a fluid environment that can include combustible gases comprising:

a set of power contacts that electrically connect said power conductors between said connector members, said power contacts having first and second members mounted on said first and second connector members, respectively, and being axially movable with respect to one another over an axial distance P between a fully withdrawn position where the electrical connection is broken and a fully inserted position where there is an electrical connection between said power contacts, a circuit breaker connected to said main conductors, means for operating said circuit breaker when said connectors are uncoupled and separated axially, said operating means including a set of auxiliary contacts each having first and second members mounted in said first and second connector members, respectively, and being axially movable with respect to one another over an axial distance A between a withdrawn position where the electrical connection between said first and second auxiliary contact members is broken and a fully inserted position where there is an electrical connection between said auxiliary contact members, said distance P being greater than said distance A, and an annular, resilient, insulating lip seal secured at one fixed end to said first connector and having a free end of smaller diameter than and surrounding a portion of said second connector in a radially stretched condition, said lip seal being disposed to block leaking of fluid between said lip seal and said connector portion and isolate the interior of said connectors adjacent said contacts from fluid external to said connectors.

2. The connector system of claim 1 wherein said lip seal extends axially on said portion for a distance B that is greater than said distance A so that said blocking and said isolation are maintained during an unmating of said connectors at least until said first and second auxiliary contacts have broken electrical connection whereby any arcing at said auxiliary contacts on breaking will not cause an explosion of said fluid.

3. The connector system of claim 2 which further comprises an insulating body, and wherein said first connector is an upper surface connector, said second connector is a feed-through mandrel adapted for use in an oil well, and said lip seal is formed integrally with said insulating body.

* * * * *